United States Patent [19]

Jacquish

[11] Patent Number: 5,064,453
[45] Date of Patent: Nov. 12, 1991

[54] AIR FILTER SYSTEM

[75] Inventor: William W. Jacquish, Elgin, Ill.

[73] Assignee: International Air Filter, Inc., Elgin, Ill.

[21] Appl. No.: 444,554

[22] Filed: Nov. 30, 1989

[51] Int. Cl.$^5$ ............................................. B01D 41/02
[52] U.S. Cl. ........................................ 55/217; 55/267;
55/312; 55/467
[58] Field of Search ................ 55/210, 269, 316, 217,
55/387, 261, 467, 318, 320, 212, 267, 312

[56] References Cited

U.S. PATENT DOCUMENTS

| | | | |
|---|---|---|---|
| 1,682,407 | 8/1928 | Nelson et al. | 98/115.2 |
| 1,745,908 | 2/1930 | Paasche | 55/440 |
| 2,311,374 | 2/1943 | Farmer et al. | 55/210 X |
| 3,075,337 | 1/1963 | Andreae | 55/446 |
| 3,249,037 | 5/1966 | Stalker | 55/210 X |
| 3,260,289 | 7/1966 | Jensen | 55/269 X |
| 3,261,147 | 7/1966 | Allander | 55/269 X |
| 3,370,404 | 2/1968 | Leeper | 55/233 |
| 3,599,399 | 8/1971 | Gallen | 55/131 |
| 3,680,287 | 8/1972 | Wood, III et al. | 55/524 |
| 3,731,459 | 5/1973 | Foster | 55/467 X |
| 3,972,678 | 8/1976 | Nakshbendi | 55/316 X |
| 4,008,060 | 2/1977 | Andreae | 55/446 |
| 4,083,701 | 4/1978 | Noack | 55/210 X |
| 4,297,116 | 10/1981 | Cusick | 55/319 |
| 4,303,417 | 12/1981 | Koch, II | 55/96 |
| 4,360,364 | 11/1982 | Kohl | 55/318 X |
| 4,364,749 | 12/1982 | Dunseith | 55/73 |
| 4,378,979 | 4/1983 | Dunseith | 55/96 |
| 4,493,718 | 1/1985 | Schweizer | 55/491 |
| 4,530,274 | 7/1985 | Lyons et al. | 98/115.2 |
| 4,543,908 | 10/1985 | Walberg | 118/326 |
| 4,689,054 | 8/1987 | Vara et al. | 55/61 |
| 4,721,033 | 1/1988 | Bloomer et al. | 98/115.2 |
| 4,770,118 | 9/1988 | Vöhringer et al. | 118/312 |
| 4,869,734 | 9/1989 | Jacquish | 55/60 |

FOREIGN PATENT DOCUMENTS 156517  9/1982  Fed. Rep. of Germany ........ 55/316

Primary Examiner—Richard L. Chiesa
Attorney, Agent, or Firm—Marshall, O'Toole, Gerstein, Murray & Bicknell

[57] ABSTRACT

This disclosure relates to a filter system with refillable filter beds containing filter media. The media is drained from the filter beds through filter media outlets located directly under the refillable filter beds. The filter media is kept below desorption temperature by opening a bypass air inlet and using a blower.

4 Claims, 2 Drawing Sheets

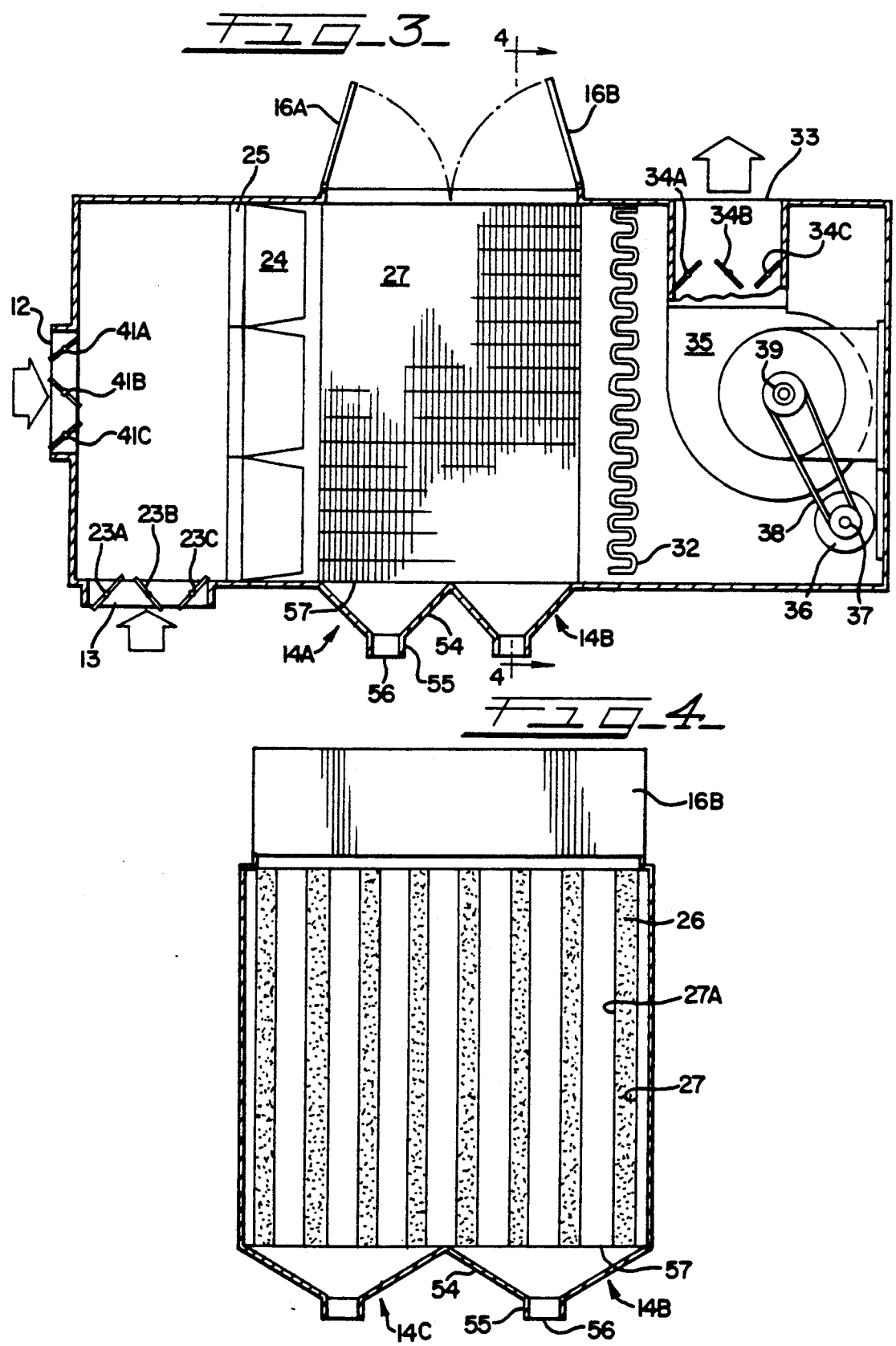

AIR FILTER SYSTEM

FIELD AND BACKGROUND OF THE INVENTION

This invention relates to an air filtering system, and more particularly, to a system in which the filter media can be easily and economically replaced.

Businesses which release small amounts of volatile organic compounds, e.g. solvents, into the atmosphere, such as body shops with paint spray booths, have not previously been subject to many local, state and federal emissions regulations. Recently, however, laws have been enacted which require businesses of this type to reduce their release of volatile organic compounds into the atmosphere.

The most common strategy for disposing of volatile organic compounds is incineration. Incineration is not a desirable alternative for use with small paint spray booths because the solvent laden air they produce has a relatively low concentration of volatile organic compounds. It is not economical to operate an incineration system when these compounds are found in low concentrations. Incineration systems are also designed to operate 24 hours a day, whereas automobile body shops are only open for 8 to 10 hours a day. Moreover, incineration systems can be extremely expensive.

Activated carbon and other filter media have been used for a number of years to adsorb volatile organic compounds. Filter media of this type, however, must be regenerated from time to time in order to maintain its effectiveness in adsorbing these compounds. Regeneration of the filter media can either be accomplished within the filter system, or the filter media can be removed and replaced, the removed media then being taken elsewhere for regeneration. There is, however, no system that presently exists which satisfies the requirements of small businesses like automobile body shops.

Regeneration of the filter media within the filter systems requires the use of extremely expensive equipment. Such a system is described in U.S. Pat. No. 4,689,054. A system of that type only becomes economical when huge volumes of solvent laden air are filtered. Automobile assembly plants and the like are generally the only operations large enough to justify such a system.

Systems in which the filter media is removed and replaced have not previously been designed to adequately satisfy the needs of small body shops with paint spray booths. The filter media in prior art systems is generally kept in removable cells or cartridges which are extremely bulky. Even relatively small filter systems may require many of these cells totaling up to 2,000 pounds of filter media. Thus, removing these filter cells can be a difficult, expensive and time consuming operation.

Generally, paint spray booths exhaust solvent laden air out through their roofs. Therefore, any filter system designed for use with existing structures may have to be located on a roof or at another poorly accessible location. The location of these systems may further exacerbate the problems associated with replacing these filter cells. Thus there remains a need for a filter system for producers of small amounts of volatile organic compounds where the filter media can be easily removed and replaced.

The temperatures inside a filter unit may reach extremely high levels. If the filter media becomes too hot, it will begin to desorb, or release into the atmosphere the compounds which have already been adsorbed. There is, therefore, a need for a filter system which can automatically cool the filter media when temperatures inside the system near desorption levels.

SUMMARY OF THE INVENTION

A filter system in accordance with the present invention uses a filter media which requires regeneration. The filter media is maintained in refillable filter beds. The refillable filter beds can be drained of their filter media by use of filter media outlets located directly under the refillable filter beds. When the filter media outlets are opened, the filter media falls out of the system and into waiting containers. The containers of used filter media can then be transported to another location for regeneration.

The filter system has a bypass air inlet which allows cool air to enter the filter system. Cool air is needed to prevent the filter media from reaching a temperature at which it will begin to desorb. A thermostat can be used to control the air flow through the bypass air inlet and to start a blower which can aid in cooling the filter media.

BRIEF DESCRIPTION OF THE DRAWINGS

The invention will be better understood from the following detailed description taken in conjunction with the accompanying figures of the drawings, wherein:

FIG. 3 is a sectional view of the air filter system taken along line 3—3 of FIG. 2;

FIG. 4 is a sectional view of the air filter system taken along line 4—4 of FIG. 3;

DETAILED DESCRIPTION OF THE PREFERRED EMBODIMENT

Figure 1:
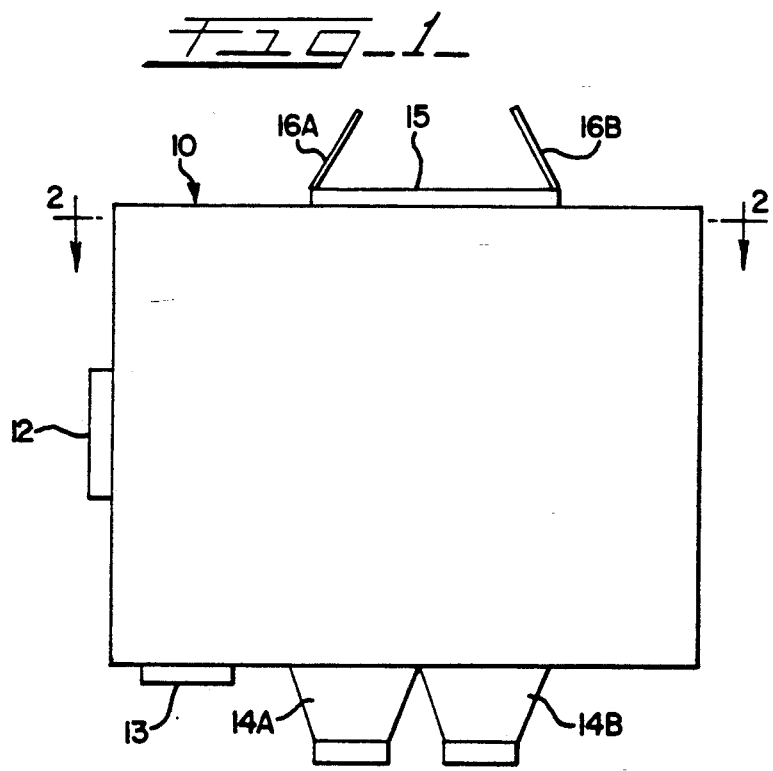
FIG. 1 is an elevational view of an air filter system constructed in accordance with a preferred embodiment of this invention.

With reference first to FIG. 1, the filter system comprises a filter housing indicated generally at 10. The filter system has a main airflow inlet 12 which receives air requiring filtering such as solvent laden air from a paint spray booth (not shown). Located at the bottom of filter housing 10 are filter media outlets 14A and 14B. Filter media can be added via a filter media inlet 15, located at the top of filter housing 10. Access to filter media inlet 15 is accomplished by opening filter media inlet doors 16A and 16B.

Figure 2:
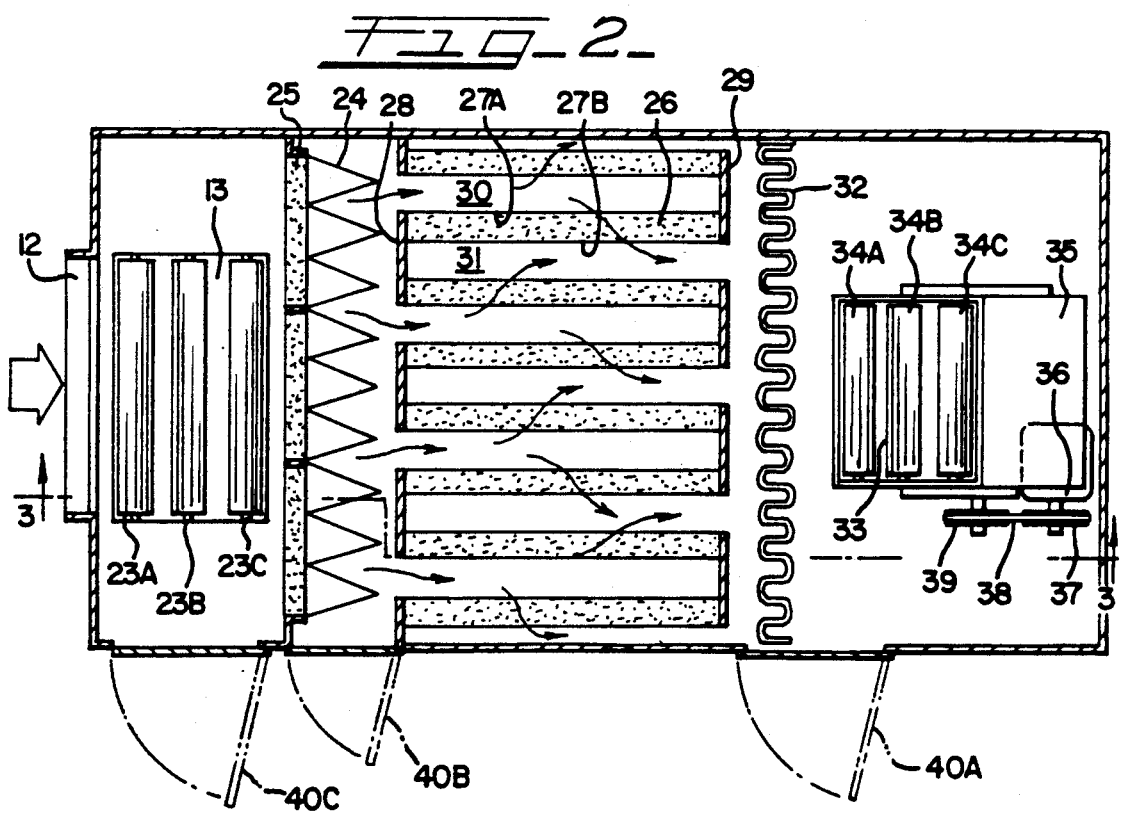
FIG. 2 is a sectional view of the air filter system taken along line 2—2 of FIG. 1.

FIGS. 2-4 depict the internal structure of filter housing 10. Solvent laden air entering through main airflow inlet 12 may be combined with ambient air entering through a bypass airflow inlet 13. Airflow through main airflow inlet 12 can be restricted by use of dampers 41A, 41B and 41C (see FIG. 3). Airflow through bypass airflow inlet 13 can be restricted by use of dampers 23A, 23B and 23C (see FIGS. 2 and 3). Dampers 41A, 41B and 41C can modulate with dampers 23A, 23B and 23C on a proportional basis.

The solvent laden air next passes through a prefilter 24 which is held in place by prefilter mounting frames 25. Prefilters are desirable in order to remove solid particles which might otherwise foul downstream filter media or screens. If the filter system is used with a paint spray booth, the prefilters would be used to remove paint particles.

After passing through prefilter 24, the solvent laden air enters an inlet air channel 30. The solvent laden air passes through a screen 27A and into a filter bed 26, which contains filter media. Clean air passes out a screen 27B and into an outlet air channel 31. In the present example, a plurality of parallel air channels 30 and 31 are provided between a plurality of parallel beds 26.

An inlet side end wall 28 runs from the bottom of the filter unit to the top of the filter unit. Inlet side end wall 28 serves to keep the filter media between screens 27A and 27B. Inlet side end wall 28 also prevents solvent laden air from flowing directly into outlet air channel 31 without first passing through filter bed 26.

An outlet side end wall 29 runs from the top of the filter unit to the bottom of the filter unit. Outlet side end wall 29 serves to keep the filter media between screens 27A and 27B. Outlet side end wall 29 will also prevent solvent laden air from passing out of inlet air channel 30 unless that air first passes through filter compartment 26.

The clean air can then pass through an energy recovery device 32, which does not substantially interfere with the airflow. There are a number of commercially available energy recovery devices which will remove heat from the air and transfer that heat for use elsewhere. Energy recovery device 32 will be particularly desirable when the filter system is used in colder climates.

A blower 35 expels the clean air through an airflow outlet 33. The amount of air passing through airflow outlet 33 is controlled by use of dampers 34A, 34B and 34C. Blower 35 is connected to a pulley 39. Pulley 39 is driven by a belt 38, which in turn is driven by a pulley 37. Pulley 37 is driven by a motor 36. Blower 35 can be volume controlled to prevent overpressurization or underpressurization in a paint spray booth.

Doors 40A, 40B and 40C permit access to the interior of filter housing 10.

The filter media chosen will depend upon the particular compounds that are being removed from the air. Some type of activated carbon in compressed pellet form will be suitable for most applications. The type and size of the filter media needed to remove particular compounds is well known to those skilled in the art.

The desired width of filter bed 26, and the distance between screens 27A and 27B, is determined by the residence time required for a particular filtering operation. The residence time is the length of time it takes air to flow through a filter bed. Increasing residence time increases the amount of volatile organic compounds removed from the solvent laden air.

The filter media in refillable filter bed 26 must be removed from time to time and replaced with fresh filter media. Filter media in refillable filter bed 26 can be removed from filter housing 10 without removing the structure forming that bed, i.e. screens 27A and 27B and end wall 28 or end wall 29. Refillable filter beds are distinguished from replaceable filter beds, such as filter cartridges or filter cells. The structure of a replaceable filter bed must be removed from a filter system in order to remove the filter media.

Filter media outlets 14A and 14B act as a means for draining the refillable filter beds 26 of filter media. The filter media outlets 14A and 14B are located directly beneath the refillable filter beds 26. In the embodiment of the filter system depicted there are four filter media outlets (only three of the filter media outlets, 14A, 14B and 14C can be seen from the drawings), which are capable of draining filter media from every refillable filter bed.

Each filter media outlet 14 is funnel shaped and has a diagonal sidewalls (FIG. 4) 54 which slant down to a conduit 55. A door 56 at the bottom of each conduit 55 can be opened to allow the filter media to drain from the refillable filter beds 26. A container (not depicted) can be placed under the conduits 55 to collect the filter media, so that the filter media can be taken to another site for regeneration.

A door 57 can also be placed immediately beneath filter beds 26. Placing door 57 at that location will lessen the amount of filter media needed to refill the filter system, because filter media will not be stored within filter media outlets 14A and 14B when the filter beds are filled with filter media.

Once the refillable filter beds 26 are empty and the filter media outlets 14A and 14B have been closed, filter media can be added through filter media inlet 15. Some additional space in refillable filter beds 26 should be provided above screens 27A and 27B. This additional space will allow for filter media settling while prohibiting solvent laden air from passing through refillable filter bed 26 without being filtered.

Every filter media has a desorption temperature at which it will begin to release the solvents or other organic compounds it has adsorbed into the atmosphere. It is, therefore, desirable to prohibit the temperature of the filter media inside refillable filter beds 26, the filter bed temperature, from reaching the desorption temperature.

The filter bed temperature may reach the desorption temperature when air entering through main airflow inlet 12 has been heated. For instance, when a paint spray booth is in a cure cycle, the booth may exhaust air which is well in excess of the desorption temperature. In order to prevent the filter bed temperature from reaching the desorption temperature, cool air can be allowed to enter through bypass airflow inlet 13 and mix with the heated air entering through main airflow inlet 12. A bypass airflow inlet valve such as dampers 23A, 23B and 23C can be opened when cool air is desired.

A thermostat 55 with lead wires 56 located in filter bed 26 is provided which opens the bypass airflow inlet valve when the filter bed temperature is near the desorption temperature. The thermostat will automatically open the airflow inlet valve when the filter bed temperature is slightly below the desorption temperature in order to provide some margin of safety. The thermostat 55 will directly monitor the filter bed temperature when it is in a filter bed 26. A thermostat could also be placed near main airflow inlet 12 to monitor the temperature of the solvent laden air as it enters the filter system.

Since filter systems may be roof mounted, the filter bed temperature may increase due to solar heating. Solar heating could occur on weekends or at other times when the filter system is not in use. Thermostat 55, which senses the filter bed temperature, can be used to start blower 35 operating. The thermostat will also control the airflow through bypass airflow inlet 13. When operating to mitigate solar heating, blower 35 will pull cool air in bypass airflow inlet 13 and through filter beds 26, thus lowering the filter bed temperature.

I claim:
1. An air filter system comprising:
   a housing;
   a main airflow inlet;
   a main airflow outlet;
   at least one prefilter;
   at least one refillable filter bed;
   a filter media outlet;
   a filter media inlet;
   a bypass airflow inlet;
   a bypass airflow inlet valve;
   a blower;
   and a thermostat;
   said filter media outlet being located directly below said refillable filter bed and operable to drain said refillable filter bed when said filter media outlet is open;
   said filter media inlet being located above said refillable filter beds and operable to add filter media to said refillable filter beds;
   said filter media outlet including closure means closing said filter media outlet when said air filter system if filtering air;
   said refillable filter bed containing a filter media;
   said filter media having a desorption temperature;
   said refillable filter bed having a filter bed temperature; and
   said thermostat opening said bypass airflow inlet valve when said filter bed temperature is near said description temperature.

2. The air filter system of claim 1, further including:
   a thermostat;
   wherein said filter beds contain a filter media;
   said refillable filter beds have a filter bed temperature;
   said filter media has a desorption temperature; and
   said thermostat starts said blower when said temperature in filter bed is near said desorption temperature.

3. The air filter system of claim 1, further including:
   an energy recovery device.

4. The air filter system of claim 1 wherein:
   said filter media inlet includes closure means closing said filter media inlet when said filter system is filtering air.

* * * * *

UNITED STATES PATENT AND TRADEMARK OFFICE
CERTIFICATE OF CORRECTION

PATENT NO. : 5,064,453

DATED : November 12, 1991

INVENTOR(S) : William W. Jacquish

It is certified that error appears in the above-identified patent and that said Letters Patent is hereby corrected as shown below:

Column 1, line 36, after "regeneration", insert --.--.

Column 6, line 3, "if" should be --is--.

Column 6, line 10, "description" should be --desorption--.

Signed and Sealed this

Sixteenth Day of March, 1993

Attest:

STEPHEN G. KUNIN

*Attesting Officer*     Acting Commissioner of Patents and Trademarks